(12) United States Patent
Yarden

(10) Patent No.: US 9,939,334 B2
(45) Date of Patent: Apr. 10, 2018

(54) FAST RESPONSIVE PERSONALIZED THERMOMETER

(71) Applicant: Medisim, LTD., Neve Ilan (IL)

(72) Inventor: Moshe Yarden, Neve Ilan (IL)

(73) Assignee: Medisim, LTD. (IL)

( * ) Notice: Subject to any disclaimer, the term of this patent is extended or adjusted under 35 U.S.C. 154(b) by 461 days.

(21) Appl. No.: 14/548,633

(22) Filed: Nov. 20, 2014

(65) Prior Publication Data
US 2015/0160079 A1    Jun. 11, 2015

Related U.S. Application Data

(60) Provisional application No. 61/912,201, filed on Dec. 5, 2013.

(51) Int. Cl.
*G01K 17/08* (2006.01)
*G01K 13/00* (2006.01)
(Continued)

(52) U.S. Cl.
CPC .............. *G01K 13/002* (2013.01); *G01K 7/42* (2013.01); *G01K 17/00* (2013.01)

(58) Field of Classification Search
CPC .. G01K 11/024; G01K 11/026; G01K 11/028; G01K 17/42; G01K 13/002;
(Continued)

(56) References Cited

U.S. PATENT DOCUMENTS 3,070,773 A    12/1962    Woolston et al.
3,774,594 A    11/1973    Huszar
(Continued)

FOREIGN PATENT DOCUMENTS

CN    102961123 A    3/2013
CN    203206907 U    9/2013
(Continued)

*Primary Examiner* — Nikolay Yushin
(74) *Attorney, Agent, or Firm* — Lerner, David, Littenberg, Krumholz & Mentlik, LLP

(57) ABSTRACT

A thermometer includes a processing unit configured to receive a plurality of timed apart temperature readings from first and second sensors and a processor calculates heat flux value, Q, and obtains values of the heat flux vs. temperature (Q vs. $T_s$.) as the temperature approaches a steady state. The processor empirically predicts the steady state temperature of the sensor Ts, using the peak value of the values of Q vs. $T_s$.
The processor may also empirically calculate a bias value as a function of the peak value of Q vs. $T_s$. The bias value represents the difference between the temperature reading ($T_s$) at steady state and core temperature of the subject and is added to the steady state temperature to arrive at core. The thermometer probe may include one or more additional sensors for obtaining physiological readings from the subject other than temperature and the processing unit is configured to use empirical formulas to calculate the bias value using the physiological readings which may include blood perfusion, pulse rate and the bio-impedance of the subject.

20 Claims, 5 Drawing Sheets

(51) Int. Cl.
*G01K 7/42* (2006.01)
*G01K 17/00* (2006.01)

(58) Field of Classification Search
CPC ........ G01K 13/00; G01K 13/02; G01K 17/00; G01K 17/20
See application file for complete search history.

(56) References Cited

U.S. PATENT DOCUMENTS

| | | | |
|---|---|---|---|
| 3,781,837 A | 12/1973 | Anderson et al. | |
| 3,972,320 A | 8/1976 | Kalman | |
| 4,075,632 A | 2/1978 | Baldwin et al. | |
| 4,411,274 A | 10/1983 | Wright | |
| 4,471,354 A | 9/1984 | Smith | |
| 4,592,000 A | 5/1986 | Ishizaka | |
| 4,618,861 A | 10/1986 | Gettens et al. | |
| 4,854,328 A | 8/1989 | Pollack | |
| 4,865,044 A | 9/1989 | Wallace et al. | |
| 4,866,621 A | 9/1989 | Ono | |
| 5,203,345 A | 4/1993 | Kennedy et al. | |
| 5,818,354 A | 10/1998 | Gentry | |
| 6,280,397 B1 | 8/2001 | Yarden et al. | |
| 6,292,685 B1 | 9/2001 | Pompei | |
| 6,439,768 B1 | 8/2002 | Wu et al. | |
| 6,595,929 B2* | 7/2003 | Stivoric | A61B 5/0008 600/549 |
| 6,890,096 B2* | 5/2005 | Tokita | G01K 7/42 374/100 |
| 7,597,668 B2* | 10/2009 | Yarden | G01K 1/165 374/102 |
| 8,185,341 B2* | 5/2012 | Yarden | G01K 1/16 702/128 |
| 2002/0010390 A1 | 1/2002 | Guice et al. | |
| 2004/0061606 A1 | 4/2004 | Gronvold | |
| 2005/0209526 A1 | 9/2005 | Ingley et al. | |
| 2007/0100666 A1* | 5/2007 | Stivoric | G01R 29/0814 705/3 |
| 2007/0239038 A1 | 10/2007 | Nicolaescu et al. | |
| 2009/0066568 A1 | 3/2009 | Britz et al. | |
| 2009/0299682 A1* | 12/2009 | Yarden | G01K 1/16 702/131 |
| 2009/0312667 A1 | 12/2009 | Utsunomiya et al. | |
| 2010/0198023 A1 | 8/2010 | Yanai et al. | |
| 2011/0298619 A1 | 12/2011 | O'Hare et al. | |
| 2012/0326874 A1 | 12/2012 | Kwak et al. | |
| 2013/0222141 A1 | 8/2013 | Rhee et al. | |
| 2016/0135426 A1 | 5/2016 | Harty et al. | |

FOREIGN PATENT DOCUMENTS

| | | |
|---|---|---|
| WO | 2013082227 A1 | 6/2013 |
| WO | 2014040999 A1 | 3/2014 |

* cited by examiner

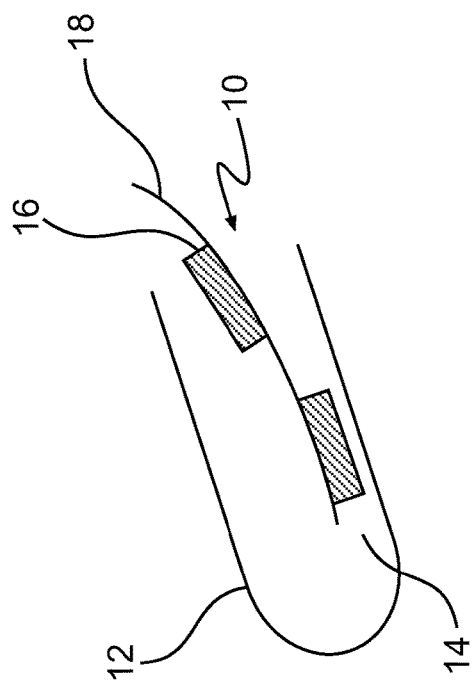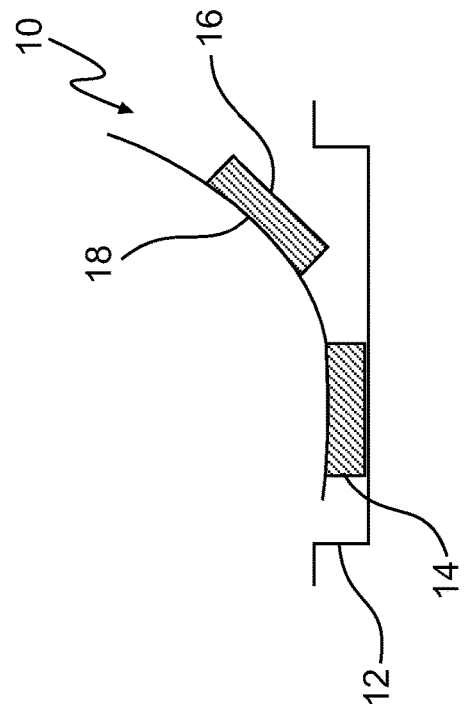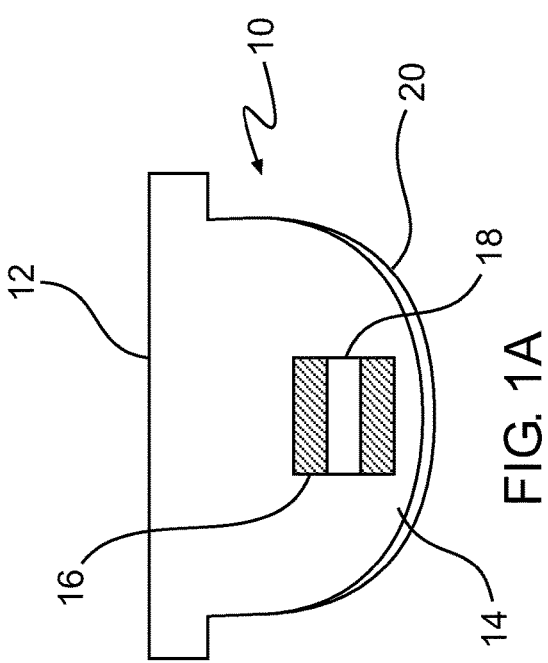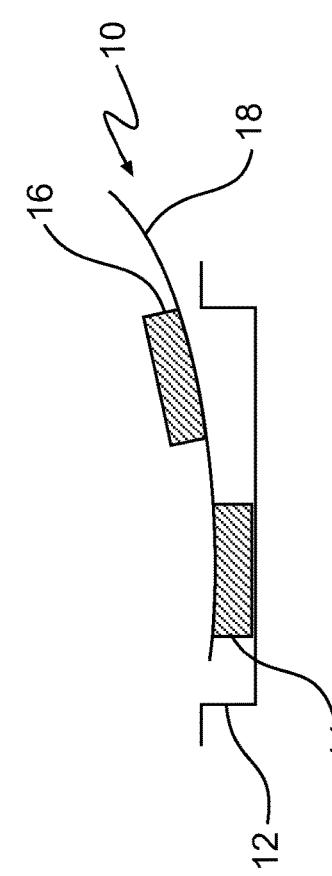

FAST RESPONSIVE PERSONALIZED THERMOMETER

CROSS REFERENCE TO RELATED APPLICATIONS

This application claims the priority of U.S. Provisional Application 61/912,201 filed Dec. 5, 2013, the entire disclosure of which is incorporated herein by reference.

BACKGROUND OF THE INVENTION

The present invention relates to thermometry and more particularly to thermometers that are more accurate and faster acting. Thermometers may be classified as invasive, where the thermometer is placed in a body cavity such as the rectum, under arm or mouth or non-invasive where the thermometer does not enter the body cavity but at most, contact's the subject's skin. Non-invasive thermometers are growing in popularity both because of their ease of use and gentleness to the subject. A common type of non-invasive thermometer includes a probe with a heat conducting membrane designed to be placed against the skin of a subject's temple, behind the ear or other body surface. An early version of such a thermometer utilized a probe to obtain temperature readings at the measuring site and an algorithm to utilize parameters derived form the measured temperature to correct a fixed bias to a reasonable proximation and clinically accepted value of the subject's core temperature, that is the temperature of blood flowing in the pulmonary artery. An improvement on this thermometer is disclosed in U.S. Pat. No. 7,597,668 to Yarden wherein a deep tissue temperature, that is, the local temperature below the skin surface at the measuring site that is the source of heat to the probe is calculated utilizing parameters derived from the measured temperatures and an algorithm is utilized to correct the calculated deep tissue temperature to core. Non-invasive temperature measurement of a deep tissue is challenging. One can measure it with commonly acceptable accuracy using a well insulated contact temperature sensor attached to the external surface above the deep tissue. When the temperature sensor is reaching to its equilibrium, the temperature value at steady state is approaching to the deep tissue temperature value and is a good representation of it. However, in some thermometers, the steady state value of the temperature sensor can be calculated within a shorter time than required to reach equilibrium. This calculation is called prediction, i.e. the thermometer is predicting the steady state value of the sensor before it reaches to the steady state and might be determined using prediction algorithms such as described in U.S. Pat. No. 4,866,621 and U.S. Pat. No. 4,592,000.

Once the local temperature (which is the steady state value of a surface temperature sensor) is determined, further algorithms are used to correct the local temperature to core.

Other non-invasive thermometers utilize IR sensors to determine the surface temperature at a measuring site along with an algorithm to convert parameters derived from the measured surface temperatures to core temperature. That is, the local or steady state value of the skin temperature is measured and then corrected to reflect the core body temperature. Such a thermometer, for example, is disclosed in U.S. Pat. No. 6,292,685 to Pompei.

An assumption in the algorithms of exiting non-invasive thermometers for converting parameters derived from temperature measurements at the measuring site to core temperature is that physiological factors other than the subject's temperature are the same or closely similar for all subjects, regardless of age, skin tone, weight, etc. That is, the assumption is that the relationship between the steady state temperature at the measuring site and a subject's core temperature is only thermal. However, it has been found that other physiological characteristics of the subject's anatomy come into play, such as the thermal conductivity, thermal impedance and blood perfusion of the subject's skin and tissue at the measuring site.

In view of the above it is a principal object of the present invention to provide an improved thermometer capable of more accurately and/or more rapidly determine the steady state temperature at a measuring site.

A further object is to provide such a thermometer that is able to rapidly calculate core temperature from the temperature and other non-temperature physiological parameters obtained preferably but not necessarily at the measuring site.

SUMMARY OF THE INVENTION

The above and other beneficial objects and advantages are attained in accordance with the present invention by providing a thermometer comprising a probe having a surface for contacting a subject. The housing contains a first sensor proximal the contact surface and a second sensor spaced apart from the first sensor and distal said contact surface. The thermometer further includes a processing unit configured to receive a plurality of timed apart temperature readings from the first and second sensors to calculate a value of the difference between the temperature readings from the first sensor ($T_s$) and the second sensor ($T_r$) at each time interval. The difference being representative of the heat flux (Q) flowing from the subject to the probe while temperature readings are being taken. The processing unit uses the readings to determine the peak value of Q vs. $T_s$ and empirically calculates a bias value as a function of Q and $T_s$ at the peak. The bias value representing the difference between the temperature reading from the first sensor ($T_s$) when the first sensor will reach a steady state temperature and a core temperature of the subject. The bias value is added to the value of reading from the first sensor ($T_s$) when the first sensor will reach a steady state temperature to arrive at the subjects core temperature. In further embodiment of the present invention, the peak value of Q vs. $T_s$ is used to predict the steady state value of the temperature sensor Ts.

In addition to the temperature sensor, the probe may include one or more additional sensors for obtaining physiological readings from the subject other than temperature. The processing unit is configured to use empirical formulas to calculate the bias value using the physiological readings which may include blood perfusion, pulse rate and the bio-impedance of the subject.

BRIEF DESCRIPTION OF THE DRAWINGS

In the accompanying drawings:

FIG. 1A is a representative view of a heat flux thermometer temperature probe;

FIG. 1B is a representative view of an alternative heat flux thermometer temperature probe;

FIG. 1C is a representative view of another alternative heat flux thermometer temperature probe;

FIG. 1D is a representative view of another alternative heat flux thermometer temperature probe;

DETAILED DESCRIPTION OF THE PREFERRED EMBODIMENTS

Figure 2A:
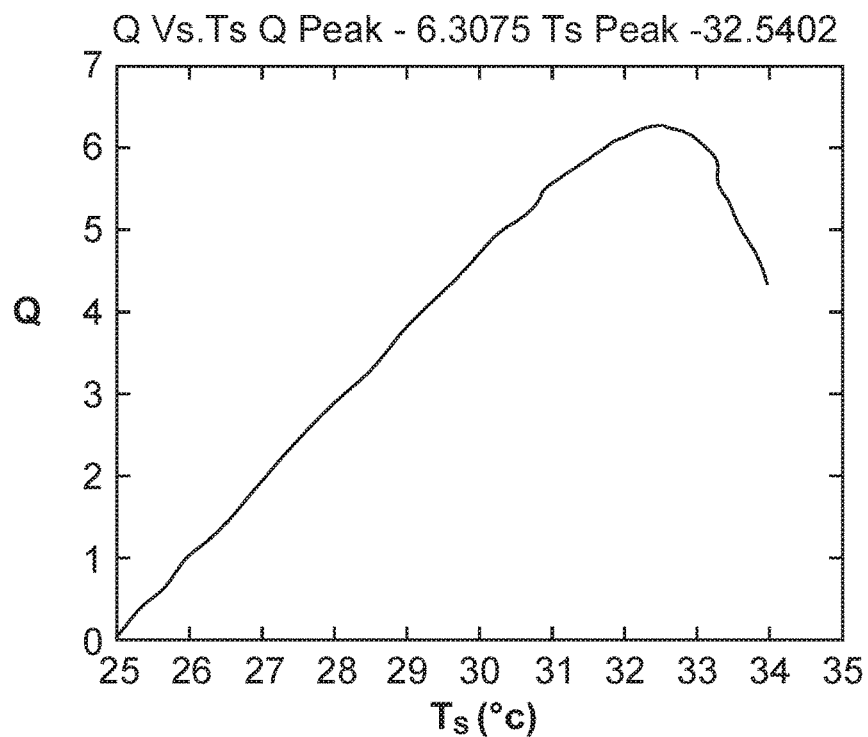
FIG. 2A is a plot of heat flux vs. temperature for a first subject.

The probe 10 of a non-invasive thermometer such as that described in the aforementioned Yarden U.S. Pat. No. 7,597,668 is depicted in FIG. 1A. The probe 10 comprises a housing 12 in which two sensors, 14 and 16 which respectively obtain temperatures $T_s$ and $T_r$ are located. The sensors may be thermistors, RTD's (Resistance Temperature Detectors) or the like (hereinafter collectively referred to as "thermistors") which are separated by air or by an insulator 18. $T_s$ is obtained from sensor 14 proximate to a membrane 20 closing the tip of the probe and hence comes closer the subject's skin while $T_r$ is the temperature obtained from sensor 16 remote from the membrane 20 and hence becomes further from the subject's skin when the thermometer is positioned on a subject's forehead or other location on the subject's skin. The output of the probe sensors is connected to a processing unit (not shown) which is configured to determine various parameters that are used to ultimately obtain and display a representation of the core temperature of the subject to which the thermometer is applied. The sensors 14 and 16 are lined up generally (but not necessarily) perpendicular to the patient's skin at the measuring site when the thermometer is used and hence the temperature difference $T_s$ and $T_r$ as measured by sensors 14 and 16 is proportional to the heat flux Q between the subject and the probe 10. Alternative probe constructions are depicted in FIGS. 1B-1D where the sensors are offset from one another.

Figure 2B:
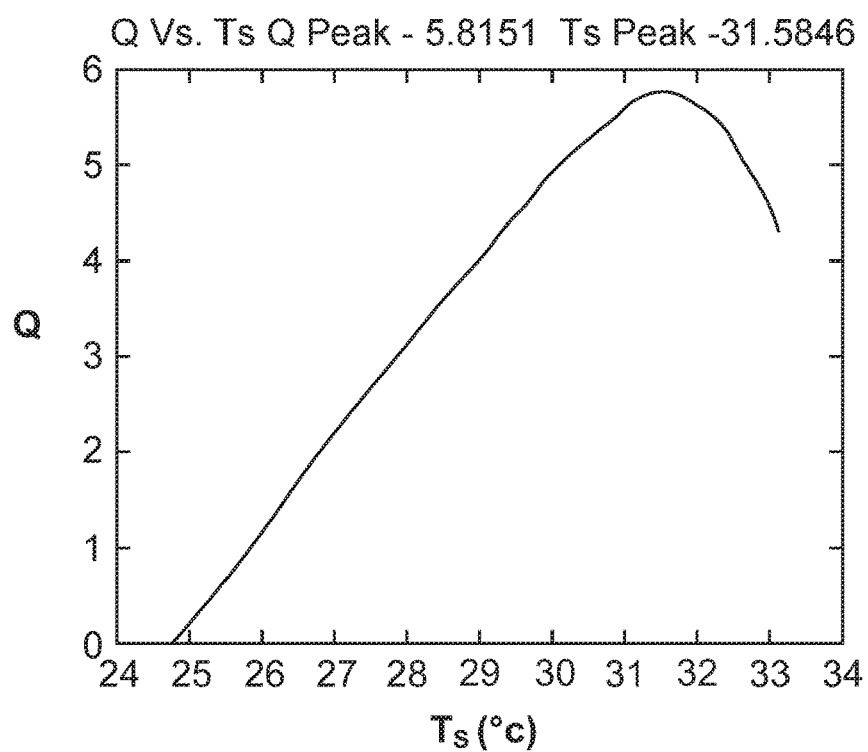
FIG. 2B is a plot of heat flux vs. temperature for a second subject.
Figure 3:
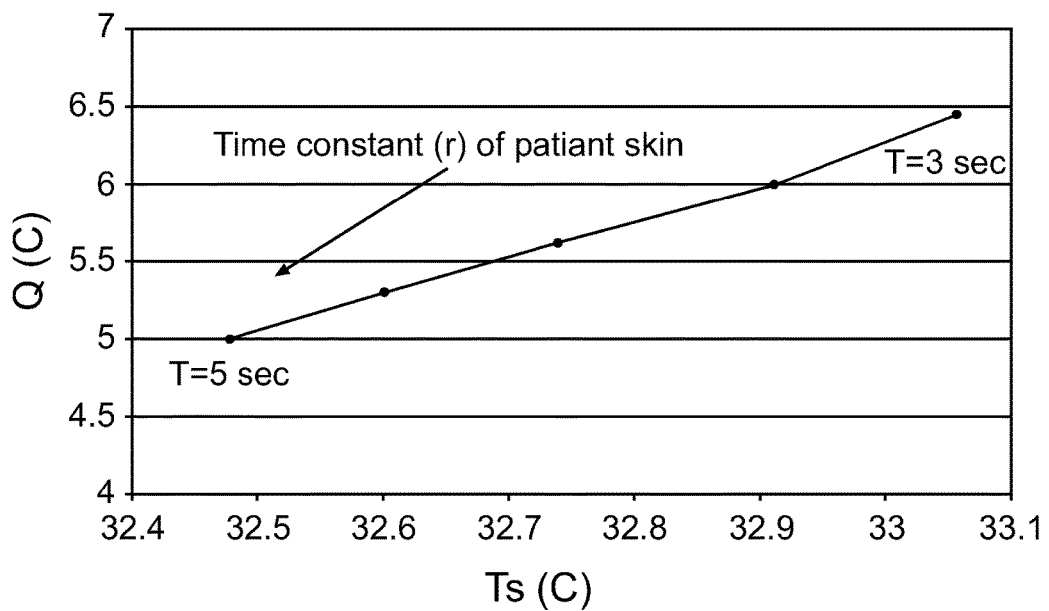
FIG. 3 is a plot of time constant vs. peak values of the Q vs. $T_s$ curve for several subjects

FIGS. 2A and 2B are curves plotting heat flux, Q vs. temperature $T_s$ during the temperature rise time. As can be seen, the curve is a generally linear line with a peak followed by a curved drop of the line. The curves 2A and 2B are from two subjects whose local temperatures and core temperatures were independently determined. For curve 2A the difference between the local temperature and core temperature (hereafter referred to as the "Bias") was 3.25° C. while for the curve 2B the Bias was 4.2° C.

τ is a time constant determined by the conductivity of tissue divided by density and heat capacity. FIG. 3 is a plot of peak values of the Q vs. $T_s$ curve for various different subjects. Through testing it was found that the peak point has a correlation to the Bias for different subject and that subjects having skin with good conductivity and relatively low thermal resistance have a higher Q vs. $T_s$ peak than subjects with skin with a relatively high thermal resistance. That is, the values on the right hand side of FIG. 3 are higher than those on the left. The steady state value of $T_s$ (i.e. at equilibrium) might be determined using prediction algorithms such as described in U.S. Pat. No. 4,866,621 and U.S. Pat. No. 4,592,000.

From the above, an improved algorithm the processor utilizes for local to core correction includes the following steps:

Record the temperatures $T_s$ and $T_r$.

Calculate Q repeatedly for the temperatures $T_s$ and $T_r$

Calculate Ts at equilibrium (steady state)

Determine the peak values of $T_s$ and Q

Calculate the Bias using an empirical formula Bias=$F(T_s, Q)_{PEAK}$

Since $T_{core}=T_s$ (at equilibrium)+Bias (1) $T_{core}=F(T_s$ (at equilibrium), $(T_s, Q)_{PEAK})$ where F is a function which can be expressed as an empirically derived polynomial or any power of its arguments to determine the core temperature.

While the invention has been described above in relation to a conduction thermometer, it is also applicable to an IR thermometer in which case $T_s$ at equilibrium would be replaced by $T_{skin}$, the local skin temperature as measured by the IR sensor so that the formula the processor utilizes for calculating $T_{core}$ becomes $$T_{core}=F((T_{skin},(T_{skin},Q)_{PEAK})$$

It has also been found through clinical testing that a correlation may be drawn between the Q-$T_s$ peak and the steady state value of $T_s$ for a conductive thermometer. Thus, the steady state value may be predicted relatively quickly by performing the following steps:

1. Record the $T_s$ and $T_r$ temperatures from the proximal and distal sensors 14 and 16 over a relatively short time (on the order of a few seconds) in the case of a forehead or oral thermometer;

2. Calculate Q;

3. Determine the peak values of $T_s$ and Q

4. Find the peak point: $T_{s\text{-}peak}$, $Q_{\text{-}peak}$

5. Use an empirical formula derived from the clinical testing to calculate $$T_s(\text{at equilibrium})=F(T_s,Q)|_{peak}$$

F being a function the processor utilizes derived empirically such as a polynomial with powers of $T_{s\text{-}peak}$ and $Q_{\text{-}peak}$ raised to powers and empirically derived coefficients based on clinical testing.

An implicit form of the formula (1), makes use of the fact that Ts at equilibrium can be predicted as a function of the peak value of Q vs. $T_s$, hence the prediction of Ts as well as the bias are calculated in one step using the formula:

$T_{core}=F((T_s, Q)_{PEAK})$ where F is a function which can be expressed as an empirically derived polynomial or any power of its arguments to determine the core temperature directly.

In the case of a non-invasive conductive thermometer, local temperature is the deep tissue temperature, represented by the steady state temperature Ts, or the skin temperature in the case of an IR thermometer and core temperature, that is the Bias, as previously discussed The difference between the local and the core temperatures is related to the thermal properties of the subject at the measuring area. Thermal conductivity, in turn, may be correlated to electrical conductivity which, in turn, may be correlated to the subjects bio-impedance at the measuring site. Impedance has a DC component and an AC component.

The latter being the resistance and the former being the frequency domain ratio of alternating current to voltage. That is, the total impedance Z may be determined by the following formula $$Z=R+iX$$

Where R is the resistance, i=and iX is the frequency dependent component of the impedance.

By applying an alternating voltage or current to the measuring site at different frequencies and measuring the voltage, the impedance may be determined. Typically the frequency for biological tissue impedance measurement ranges between 100 Hz and 100 K HZ. To avoid the possibility of the body of a subject exhibiting different compliance at different frequencies impedance measurement should be taken at different frequencies and the corresponding impedance should be used as an input of a multi-variable function to determine the Bias according to the formula $$\text{Bias}=F(a_1*Z_1,\ldots,a_n*Z_n)$$

Where $a_1,\ldots,a_n$ are empirically derived parameters and $Z_1,\ldots,Z_n$ are the measured tissue impedance values at the applied frequencies. An algorithm the processor utilizes for local to core temperature correction taking advantage of bio-impedance may thus include the following steps:

1. Record the $T_s$ and/or $T_r$ from the sensors proximate and distal the measuring site;
2. Calculate $T_s$ (at equilibrium) using a prediction algorithm;
3. Measure the tissue bio-impedance at the measuring site or in another suitable body site;
4. Use the formula $\text{Bias}=F(a_1*Z_1,\ldots,a_n*Z_n)$ to calculate Bias
5. Calculate $T_{core}$ using the formula $T_{core}=T_s$ (at equilibrium)+Bias Where $a_i,\ldots,a_n$ are empirically derived parameters and $Z_1,\ldots,Z_n$ are the measured tissue impedance for n applied frequencies respectively.

The steady state value of $T_s$ (i.e. at equilibrium) might be determined using prediction algorithms such as described in U.S. Pat. No. 4,866,621 and U.S. Pat. No. 4,592,000.

The Bias may be obtained based on the bio-impedance and the measured temperatures $T_s$ and $T_r$ using the function $\text{Bias}=F(a_1*Z_1,\ldots,a_n*Z_n, g_1(T_s), g_2(T_r))$ where $g_1$ and $g_2$ are empirically derived functions of $T_s$ and $T_r$ and $T_{core}$ may be derived using the formula $$T_{core}=T_s(\text{at equilibrium})+\text{Bias.}$$

Thus, $T_{core}$ may be derived using the formula $$T_{core}=T_s(\text{at equilibrium}),(a_1*Z_1,\ldots,a_n*Z_n),g_1(T_s),g_2(T_r))$$

Where F, $g_1$, $g_2$ are functions that can be a polynomial or any powers of their arguments which can be derived empirically from clinical testing.

Figure 4:
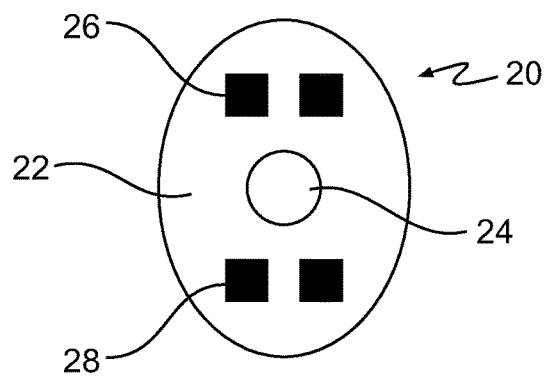
FIG. 4 is a representative view of a thermometer probe utilizing patient impedance.
Figure 5:
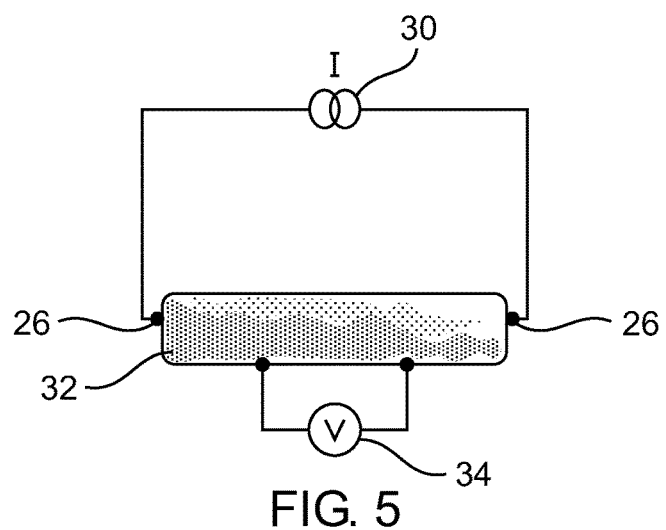
FIG. 5 depicts the circuit of the probe of FIG. 4.

FIG. 4 depicts a thermometer probe 20 comprising a metal plate 22 on which a temperature sensor 24 and a two set of electrodes 26, 28 are mounted. As shown in FIG. 5, the electrodes 26, 28 apply a test signal in the form of a frequency-modulated current from the generator 30 across a section of tissue of the subject 32 which the meter 34 measures to obtain the tissues' response to the applied current to obtain values from which the bio-impedance may be derived and applied as previously described. Whether the temperature sensor 24 is conductive or an IR sensor, the portion of the probe containing the electrodes 26, 28 must be in contact with the subject or in a separate sensor contacting the subject to obtain the bio-impedance.

A factor that affects the temperature at the measuring site is the amount of blood flowing to the site or blood perfusion. The higher the blood perfusion the higher the local temperature and hence the lower the Bias. Thus, the Bias may be expressed as a function of perfusion, or $$\text{Bias}=F(B_{pf}) \text{ where } B_{pf} \text{ is a parameter representing the blood perfusion rate.}$$

Figure 6:
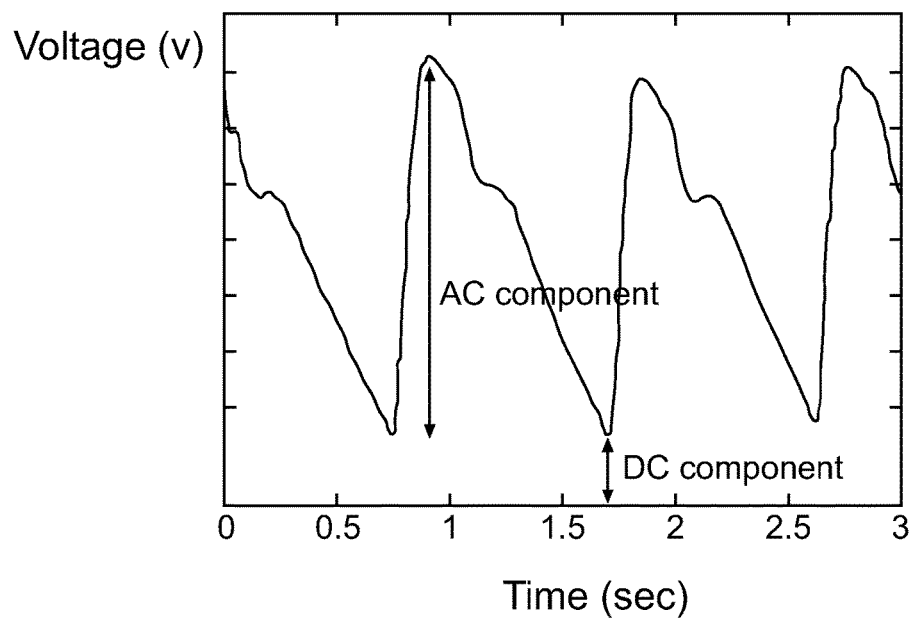
FIG. 6 is a representative plot of PPG voltage values vs. time.

A measurement of the blood flow may be obtained using a photoplethysmogram (PPG) to obtain a signal representative of the blood flow in the tissue at the measuring site. The PPG signal may be divided into an AC and a DC component with the AC component being synchronous with heart beat and correlating directly to blood flow while the DC component establishes a baseline reflecting the total blood volume of the tissue at rest as shown in FIG. 6 and $B_{pf}$ may be derived from the AC and DC components. The Bias may be calculated based on blood perfusion and the measured temperatures $T_s$ and $T_r$ and the function for Bias calculation would take the form $$\text{Bias}=F(B_{pf}),h_1(T_s),h_2(T_r)$$

Where $h_1$ and $h_2$ are empirically derived functions of $T_s$ and $T_r$.

Figure 7:
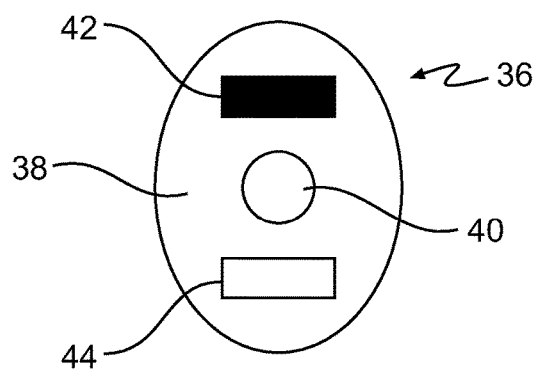
FIG. 7 is a representative view of a thermometer probe utilizing blood perfusion.

A representative probe 40 for making use of blood perfusion in establishing a patient's temperature is depicted in FIG. 7. The probe 36 includes a base plate 38 to which at least one temperature sensor 40 is mounted along with an LED 42 and photo detector 44. The LED 42 and photo detector 44 serve to obtain PPG measurement by measuring the portion of the light emitted by the LED that is absorbed by the tissue to obtain a voltage output as depicted in FIG. 6. The PPG probe may be a transmitter type probe where the LED and photo-detector are on opposite sides of the tissue to be measured as shown in FIG. 7 or of the reflective type (not shown) where the LED and photodetector are on the same side of the tissue.

As shown in FIG. 6 the PPG graph is an indicator of pulse rate. There is a known correlation between pulse rate and temperature generally on the order of each degree C. of temperature increase causing an increase of approximately 10 beats per minute. Therefore better accuracy of a temperature reading may be obtained knowing the pulse rate and a Bias calculation taking into account the pulse rate would take the following form $$\text{Bias}=F(\text{Pulse rate})$$

Where F(Pulse rate) is an empirically derived formula the processor utilizes for correlating the predicted temperature of a subject to the subject's pulse rate.

The calculation may also take into account blood perfusion so that the calculation would take the form $$\text{Bias}=F(Bpf,\text{Pulse})$$

So that the final core temperature calculation the processor utilizes would take the form $$T_{core}=F(T_s(\text{at equilibrium}),Bpf,\text{Pulse})$$

Where F is a function that can be a polynomial or any power of its argument and can be derived empirically.

Figure 8:
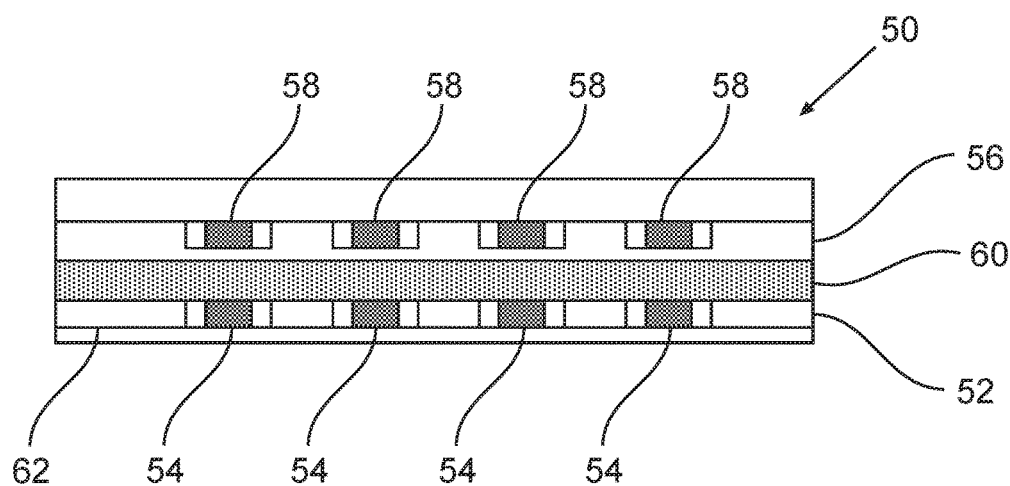
FIG. 8 is a representative view of a continuous monitoring thermometer.

While the present invention has heretofore been described in connection with a conventional thermometer that measures temperature at a given time, it also applies to a continuous monitoring thermometer. FIG. 8 is a cross sectional view of a patch thermometer 50 for continuous monitoring of the temperature of a patient. The thermometer 50 comprises a skin sensor layer 52 containing one or more sensors 54 and a remote sensor layer 56 containing an equal number but not necessarily of remote sensors 58 separated by an insulator 60. An adhesive layer 62 on the front of the patch is provided to enable the probe to be attached to the subject. The patch thermometer 50 is designed to be kept in place for extended period of time and hence the skin layer will reach equilibrium, $T_s$ (at equilibrium) at some point while the patch thermometer is in place and before the patch thermometer is removed. However, since $T_s$ (at equilibrium) is not the core temperature $T_{core}$, it needs to be calculated by determining the Bias and adding that to the local temperature, $T_s$ (at equilibrium).

The Q vs. T method previously described for establishing Bias may be utilized with some minor modification. To obtain the peak values, the skin sensor readouts at the beginning of the session (during the first 10-30 seconds of any temperature change, prior to sensor 54 reaching $T_s$ (at equilibrium)) must be obtained since once steady state is attained there are no longer any peaks. Once the peaks are obtained the algorithm for obtaining Bias is as previously described with some further minor modifications. Thus an algorithm for obtaining Bias of a continuous monitoring thermometer would include the following steps 1. Calculate $T_{s\_avg}$ and $T_{r\_avg}$ by averaging $T_{si}$ and $T_{ri}$, respectively;

2. Calculate Q, which is a function of $T_{s\_avg} - T_{r\_avg}$;

3. Obtain values of Q vs. $T_{s\_avg}$ 4. Find the peak point: $T_{s\_avg\text{-}peak}$, $Q_{\text{-}peak}$ $(Q, -T_{\text{-}spot})$ 5. Use an empirical formula to calculate Bias, Bias=$F(T_{s\_avg}, Q)|_{peak}$ Where $T_{si}$ and $T_{ri}$ are the i sensors of the first and second layers 52, 56, respectively. The core temperature is obtained by adding the Bias to the equilibrium temperature according to the relation $$T_{core} = T_{s\text{-}avg(at\ equilibrium)} + \text{Bias}$$

Rather than using average values of $T_{si}$ and $T_{ri}$ the maximal values of the various $T_{si}$ and $T_{ri}$ readings or any other combination thereof, may be used in the above algorithm in place of $T_{s\_avg}$ and $T_{r\_avg}$, respectively.

Figure 9:
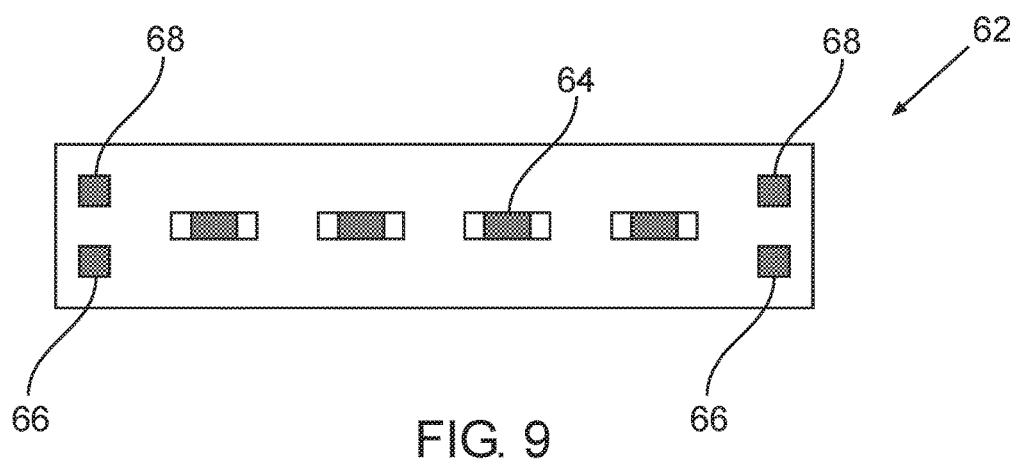
FIG. 9 is a representative view of a continuous monitoring thermometer utilizing bio-impedance.

FIG. 9 is a continuous temperature measurement patch 62 utilizing bio-impedance. The patch is similar to FIG. 4 except that there are multiple skin and remote sensors 64 designed to be kept in place on a subject over an extended period of time along with electrodes 66, 68. The alternatives described in connection with the single probe 20 are likewise applicable and the core temperature is derived as heretofore described.

Figure 10:
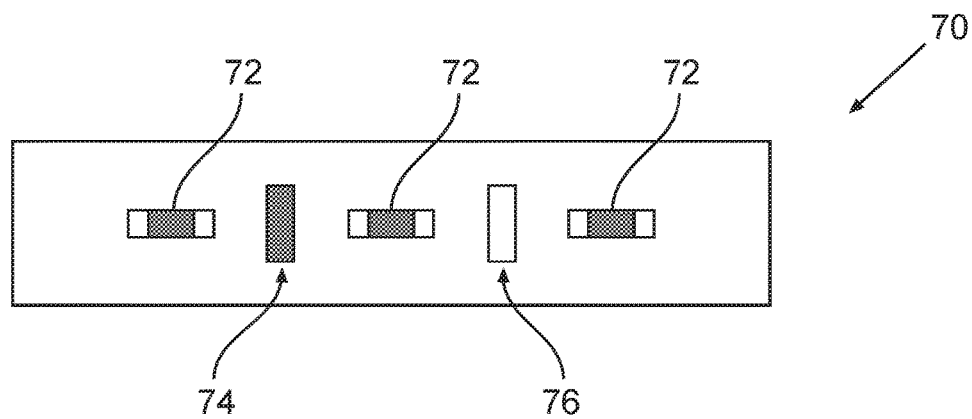
FIG. 10 is a representative view of a continuous monitoring thermometer utilizing PPG.

Similarly FIG. 10 depicts a PPG based correction continuous measurement thermometer 70. In this case, the patch contains temperature sensors 72, LED 74 and photo-detector 76 which operate as previously described to obtain PPG and pulse information which may be used to derive the Bias as before under the formula $$\text{Bias} = F(B_{pf}), h_1(T_s), h_2(T_r).$$

Thus in accordance with the above, the aforementioned objects and advantages are effectively attained. Although preferred embodiments of the invention have been disclosed and described, it should be understood that this invention is not limited thereby and the scope is to be determined by the following claims.

Having thus described the invention, what is claimed is:

1. A thermometer for determining an internal temperature of a subject comprising:

a probe;

a first sensor forming a part of the probe and configured to obtain temperature readings from an external surface of the subject; and a processing unit configured to receive a plurality of timed apart temperature readings, Ts, from the first sensor;

to calculate a value of the heat flux (Q) flowing from the subject to the first sensor;

to determine a peak value of Q and a corresponding value of Ts; and to utilize the peak value of Q and the corresponding value of Ts to determine the internal temperature of the subject.

2. The thermometer in accordance with claim 1 wherein the processing unit is further configured to predict a steady state temperature of first temperature sensor.

3. The thermometer in accordance with claim 1 wherein said subject's temperature is monitored continuously and said values of Q vs. Ts are obtained prior toTs reaching its steady state value.

4. The thermometer in accordance with claim 1 wherein the processing unit is further configured to calculate a bias value representing a difference between a clinically acceptable proximation of a core temperature of the subject and a local temperature of the subject at a measuring site as a function of the peak value of Q vs. Ts. and to use the bias value to arrive at the core temperature of the subject.

5. The thermometer in accordance with claim 4 wherein the local temperature is a steady state temperature of the first sensor.

6. The thermometer in accordance with claim 5 wherein the first sensor is a thermistor and the local temperature represents a deep tissue temperature at the measuring site.

7. The thermometer in accordance with claim 5 wherein the first sensor is an IR sensor and the local temperature is a skin temperature of the subject at the measuring site.

8. The thermometer in accordance with claim 1 wherein the probe includes a surface for contacting the subject, the first sensor is proximal said surface and further including a second sensor spaced apart from the first sensor and distal said surface wherein said heat flux (Q) is determined at each time interval as a function of the difference between the temperature readings Ts from the first sensor and readings Tr from the second sensor.

9. The thermometer in accordance with claim 8 wherein the first sensor and the second sensor are aligned generally perpendicular to the surface for contacting the subject.

10. The thermometer in accordance with claim 8 wherein the first sensor and the second sensor are offset from one another in a direction orthogonal to a perpendicular to the surface for contacting the subject.

11. The thermometer in accordance with claim 8 wherein at least one of said first and second sensors comprise thermistors.

12. The thermometer in accordance with claim 8 wherein said subject's temperature is monitored continuously and said values of Q vs. Ts are obtained prior to Ts reaching its steady state value.

13. A thermometer comprising:
a probe;
a temperature sensor forming a part of said probe and configured to obtain temperature readings from a subject at a measuring site; and
a processing unit configured
to obtain said temperature readings from the subject and from said temperature readings to determine a steady state temperature of the temperature sensor at the measuring site;
to obtain physiological readings from a non-temperature sensor and to empirically calculate a bias value as a function of said physiological readings, said bias value representing a difference between the said determined steady state temperature of the sensor and the core temperature of the subject;
to use the bias value and the said determined steady state temperature to arrive at the core temperature; and
wherein said non-temperature sensor is configured to measure a bio-impedance or a blood perfusion of the subject and said bias value is calculated as a function of the measured bio-impedance or blood perfusion.

14. The thermometer in accordance with claim 13 wherein said temperature sensor is a thermistor.

15. The thermistor in accordance with claim 13 wherein said temperature sensor is an IR sensor.

16. The thermometer in accordance with claim 13 wherein said non-temperature sensor forms another part of said probe and is configured to obtain physiological readings from said subject at the same measuring site as that for obtaining said subject's temperature.

17. The thermometer in accordance with claim 13 wherein said subject's temperature is monitored continuously and said values of Q vs. Ts are obtained prior to Ts reaching its steady state value.

18. The thermometer in accordance with claim 13 wherein said non-temperature sensor is a photoplethysmogram (PPG).

19. The thermometer in accordance with claim 18 wherein said photoplethysmogram produces a signal having an AC component synchronous with a subject's pulse rate and a DC component wherein said bias value is calculated as a function of a subject's pulse rate.

20. The thermometer in accordance with claim 19 wherein said bias value is calculated as a function of a subject's pulse rate and a measured blood perfusion.

* * * * *

UNITED STATES PATENT AND TRADEMARK OFFICE
CERTIFICATE OF CORRECTION

PATENT NO. : 9,939,334 B2
APPLICATION NO. : 14/548633
DATED : April 10, 2018
INVENTOR(S) : Moshe Yarden Page 1 of 1

It is certified that error appears in the above-identified patent and that said Letters Patent is hereby corrected as shown below:

In the Claims

Column 8, Line 12, "of the heat" should read -- of a heat --.
Column 8, Line 22, after "of", insert -- the --.
Column 8, Line 25, "toTs" should read -- to Ts --.
Column 8, Line 32, "Ts." should read -- Ts --.
Column 9, Line 15, "and the core" should read -- and a core --.
Column 10, Line 18, "with a subject's" should read -- with the subject's --.
Column 10, Line 20, "of a" should read -- of the --.

Signed and Sealed this
Second Day of April, 2019

Andrei Iancu
*Director of the United States Patent and Trademark Office*